Nov. 4, 1952 T. W. GRIFFIN 2,616,380
FOREHEARTH ROOF STRUCTURE
Filed June 14, 1950

INVENTOR
THOMAS W. GRIFFIN
BY Parham + Bates
ATTORNEYS

Patented Nov. 4, 1952

2,616,380

UNITED STATES PATENT OFFICE 2,616,380

FOREHEARTH ROOF STRUCTURE

Thomas W. Griffin, Weatogue, Conn., assignor to Emhart Manufacturing Company, a corporation of Delaware Application June 14, 1950, Serial No. 168,098

6 Claims. (Cl. 110—99)

This invention relates generally to improvements in forehearths for receiving a stream of molten glass from a glass melting tank furnace or other source and for conducting it to a delivery chamber at the outer end of the forehearth from which molten glass is fed in mold charges, gathered in receptacles, drawn in fibers or otherwise removed.

The invention relates more particularly to an improved roof structure for a forehearth and an important object of the invention is to prolong beyond the normal the useful life of such a roof structure.

Forehearth roof structures are subject to rapid deterioration resulting from various causes, including a high temperature in the forehearth, the effect of internal pressure in the forehearth, and attack by volatiles from the glass in the forehearth.

The rapidity of deterioration of forehearth roof structures has of course varied with conditions of service. Thus, the life of the roof or cover structure of a forehearth in which boro-silicate glass flows to a delivery chamber from which it is drawn in thin fibers has been relatively short since the operating temperature in such a forehearth is required to be relatively high, as in a range of 2600° F. to 2800° F. as measured by thermo-couples in the forehearth roof. To attain such a high temperature with a usual combustion system has necessitated very high internal pressure. This in turn has had an extremely harmful effect on the components of the roof structure in that it has forced volatiles from the glass, which are very deleterious at the high temperatures into any and all available recesses, cracks, crevices, passages, etc., of the roof structure. The condition has been particularly acute in forehearths using firing systems producing combustion in the space over the glass in the forehearth and in connected flues, the burning action therein accelerating the destruction of the forehearth roof structure.

Because of the high temperature required in forehearths containing boro-silicate glass to be drawn in fibers and for some other operations, the forehearth roof blocks often sag or collapse. For ordinary container glass, which usually is supplied to the forehearth at a temperature above that at which it is to be fed or otherwise removed, some cooling of the glass stream in the forehearth or at least of the longitudinal median portion thereof may be required and some measure of protection of the roof blocks can be obtained by the glass cooling means employed, as in the case of the forehearth disclosed in U. S. Patent No. 2,144,973, for example, which has means to discharge cooling wind into the forehearth against the undersurface of the roof structure to cool the glass but with an incidental roof cooling effect. The glass cooling provisions of such a prior forehearth render it unsuitable for use for boro-silicate glass to be removed as drawn fibers or for other high temperature conditions of service which require avoidance of any positive cooling action on the glass. Moreover, such a prior forehearth does not afford protection of the roof structure against volatiles from the glass.

A more specific object of the present invention is to provide a forehearth roof structure having effective means to apply controllable cooling wind thereto so as to prolong the life of the roof structure without lowering the glass temperature.

The novel structural and cooling wind provisions of a forehearth roof of the invention keep the volatiles from the glass out of the joints between components of the roof structure and out of any cavities or chambers therein and limit to a minimum possibility of attack of any and all surfaces of such roof structure by these volatiles, keep the roof structure below its sagging temperature, act as a variable roof insulation, and effect some cooling of the exhaust gases from the forehearth to reduce their temperature and the stack pressure.

Other objects and advantages of the invention hereinafter will be pointed out or will become apparent from the following description of a practical embodiment of the invention, as shown in the accompanying drawings, in which.

Figure 1:
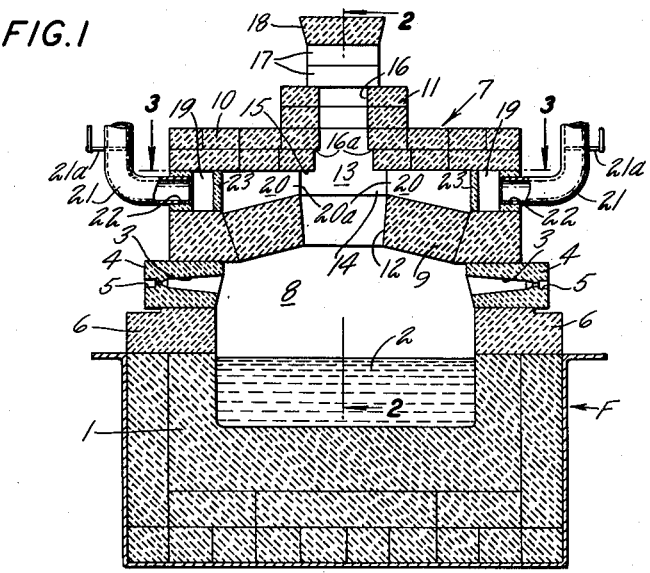
Figure 1 is a transverse vertical section through a forehearth having a roof constructed and equipped with cooling wind provisions according to the invention.

A forehearth to which the invention has been applied is indicated generally by F in Fig. 1 and comprises a refractory channel 1 of generally U-shape in cross-section containing a stream of molten glass 2. The refractory channel 1 is suitably supported and encased by known means and in a known manner, the details of which are not important here. It will be understood that the stream of molten glass enters one end of the channel from a supply melting tank furnace, not shown, and flows in such channel to a delivery chamber, also not shown, appropriate for removal of glass therefrom in the manner and for the purpose intended.

During its flow through the channel, the glass of the stream must be subjected to temperature regulating influences so that glass arriving at the place of removal will be as nearly as possibly in the condition and at the temperature required. The molten glass tends to lose heat to and through the bottom and side walls of the forehearth and to retain relatively more of its supply heat in its longitudinal median portion. It is usual to apply heat to the glass stream in the forehearth. I prefer heating means substantially as disclosed in the aforesaid U. S. Patent No. 2,144,973. Such heating means comprises tunnel type combustion ports, such as indicated at 3, in burner blocks 4 which are included in the side walls of the forehearth above the level of the glass stream therein. Combustible fuel is supplied to such combustion ports through suitable burners, not shown, operatively associated with the outer end portions 5 of the ports. In the example shown, the burner blocks 4 rest on refractory side wall blocks 6 so that they are located at a substantial distance above the glass level. However, they may be lower and nearer the glass level as in the example shown in the aforesaid U. S. Patent No. 2,144,973.

The forehearth includes a cover or roof structure, generally designated 7, which cooperates with the side walls of the forehearth to inclose a space 8 above the glass in the forehearth channel. Gaseous products of combustion customarily are vented from such a forehearth space through suitable vertical outlet passages in the longitudinal median portion of the forehearth roof or cover structure and dampers may be provided at the upper ends of such exhaust passages to regulate the exhaust. The roof structure 7 of the present invention is of this general type of construction but includes novel structural and cooling provisions hereinafter to be described.

The forehearth roof or cover structure 7 comprises a lower section 9 formed of suitable refractory blocks suitably joined together in a conventional manner to have the shape of an arch or any other suitable and preferred shape in cross-section. Next above the section 9 is an intermediate section 10 of the desired height and formed of brick suitably joined together in a known manner. The component brick of section 10 may have some heat insulating characteristics while still being highly resistant to heat. Surmounting the intermediate section 10 is a top section 11 of the desired height and formed of suitably shaped brick resistant to heat but having good insulating properties. In the example shown, the top section 11 is provided only on the longitudinal median portion of section 10. See Fig. 1.

Figure 2:
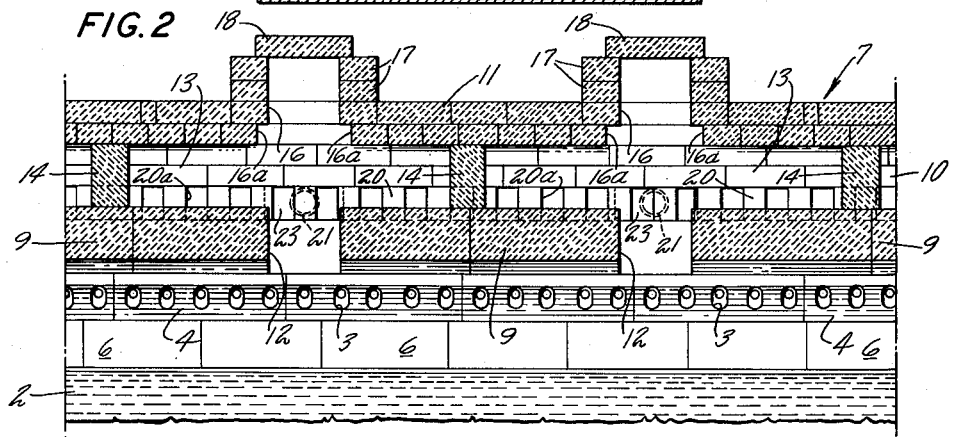
Fig. 2 is a longitudinal vertical section through the roof structure of the forehearth substantially along the line 2—2 of Fig. 1.
Figure 3:
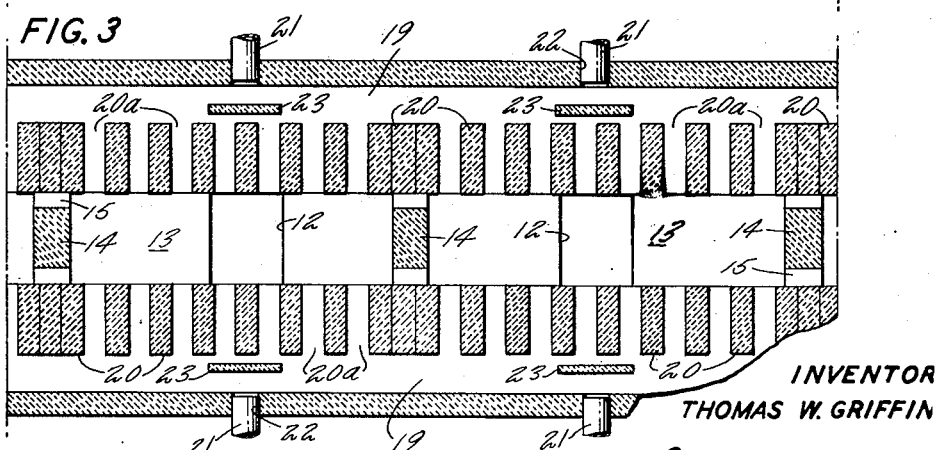
Fig. 3 is a horizontal section through the roof structure, substantially along the line 3—3 of Fig. 1.

The lower section 9 is provided with one or a plurality of longitudinally spaced vertical outlet openings 12 therein, these openings varying in number and spacing according to the length of the forehearth and individual preference or service requirements. Each opening 12 is of substantial area in cross-section and is located intermediate the width of the forehearth roof structure so as to overlie the longitudinal median portion of the glass stream 2. Each outlet opening 12 opens into a cooling chamber 13 which, as best seen in Fig. 2, is elongated both ways from the outlet opening 12 in the direction of the length of the forehearth. Transverse division blocks 14 are provided if desired between adjacent chambers 13 if there is more than one of the outlet openings 12 and more than one of the chambers 13. As shown in Fig. 3, the transverse partition walls 14 may be notched at their upper corner portions, as indicated at 15, to accommodate corner portions of adjacent components of the roof section 10 as shown in Fig. 1.

Each cooling chamber 13 is provided with an outlet in the form of a vertical opening 16 in the top section 11 of the forehearth cover structure. Each opening 16 is located directly above and in line with the bottom outlet opening 12 and preferably has an area in transverse section at its bottom portion at least equal to that of the bottom outlet opening 12. Such top outlet openings may be enlarged fore-and-aft at its lower end as indicated at 16a, Fig. 2. If desired, the top outlet opening 16 may be extended upward above the roof section 11 to increase the stack effect thereof by surrounding its upper end with stack brick or blocks such as those shown at 17, Figs. 1 and 2, at only the front and rear edges thereof. Removable damper blocks, as indicated at 18, may be provided to rest upon the brick or blocks 17 and may be adjusted vertically in relation thereto in a known manner by known means, not shown. The stack brick or blocks 17 and the dampers 18 or the latter alone may be completely removed if service conditions require or make this desirable.

The intermediate section 10 of the roof structure is formed to provide longitudinally extending cooling air manifolds 19 at the outer sides of the series of cooling chambers 13. The cooling air manifolds 19 communicate with the chambers 13 through series of closely spaced transverse ports 20a provided between spaced blocks 20, longitudinal series of which extend between the manifolds 19 and the chambers 13 throughout the length of the intermediate cooling chambers 13 as best seen in Fig. 3, and between the roof sections 9 and 10, respectively, Figs. 1 and 2. The ports 20a preferably extend the full height of the blocks 20. The upper surface of the lower section 9 of the forehearth roof is the floor of the communicating manifolds 19, ports 20a, and intermediate chambers 13.

Cooling air under pressure, usually termed "cooling wind," is supplied to the manifolds 19 through supply pipes 21 having delivery ends fitted in suitable openings 22 in the outer side walls of such manifolds. Preferably, baffle blocks 23 are disposed in the manifolds 19 in front of the discharge ends of the cooling air supply pipes 21 so as to diffuse the cooling air throughout the manifolds and hence provide cooling air passing through the respectively ports 20a to the cooling chambers 13 at numerous closely spaced places along the entire length of each of the side walls of each such cooling chamber. The pipes 21 may receive cooling air under pressure from a fan or other suitable source of supply, (not shown). Valves 21a may be provided to regulably control delivery of cooling wind therefrom to the manifolds.

The operation of a forehearth having a roof structure provided with cooling provisions of the present invention as hereinbefore particularly described will be understood without an extended explanation. The products of combustion from the burner ports 3 will pass transversely of the forehearth close to or in scrubbing relation to the undersurface of the lower section 9 of the roof structure to the outlet openings 12, thereby shielding the undersurface of the refractory roof structure from volatiles from the glass which will be entrained into the outlet openings 12 with the outgoing products of combustion. Cooling wind from the longitudinally extending side manifolds 19 will pass into the central chambers 13 from both sides thereof and converge toward the openings 16 in the top section of the forehearth structure. They thus will serve to cool the lower section 9 of the roof structure at its top surface without any direct cooling on the underlying stream of molten glass. They further serve to protect the roof structure by excluding from the cooling chambers volatiles which otherwise would be driven thereinto. Finally they are entrained with the volatiles and products of combustion which pass from the openings 12 upward into the directly overhead top openings 16 and through the latter and any stack extensions thereof to the outside atmosphere. These outgoing streams of cooling wind thus aid draft of volatiles and exhaust gases. This will have the effect of reducing the internal pressure for given temperature and combustion conditions in the space 8 above the glass in the forehearth and of reducing the temperature of the exhaust gases.

The lower section 9 of the roof structure which of course is exposed at its lower surface to heat from the heating system and from the glass will be sufficiently cool at its top surface to prevent sagging or collapse thereof even when the temperature in the forehearth is required to be relatively high. The cooling air also serves as a heat insulating shield or baffle between the lower section 9 of the forehearth cover structure and the higher sections thereof so that these upper sections may function to best advantage as further heat insulating means for the forehearth.

In the event that some cooling of the glass is desirable during its flow through the forehearth, the requisite cooling under most service conditions and for most uses of the forehearth may be obtained by turning down the burners, or, in other words, reducing the heat applied to the forehearth in a known manner so that the cooling of the lower section 9 of the forehearth cover structure may have the desired cooling effect. A forehearth provided with the improved roof structure thus may be used under a wide variety of operating conditions and for conducting glasses of different compositions at widely different temperatures and for specifically different purposes.

The illustrative embodiment of the invention shown in the accompanying drawings and hereinbefore particularly described may be changed and modified in many ways as now will be obvious to those skilled in the art and I, therefore, do not wish to be limited to the details thereof.

I claim:

1. In a forehearth, a roof structure formed to provide a vertical outlet passage for exhaust gases in its longitudinal median portion, a cooling chamber located in said roof structure and communicatingly intersecting the outlet passage above the lower surface of the roof structure and of greater area in horizontal cross-section than the outlet passage, and means communicating directly with said chamber through spaced transverse ports provided wholly in the roof structure along opposite sides of the cooling chamber for supplying cooling air under pressure thereto.

2. In a forehearth, a roof structure as defined by claim 1 wherein said cooling chamber extends in said roof structure both ways from said outlet passage in the direction of length of the roof structure.

3. In a forehearth, a roof structure comprising a lower section, an intermediate section and an upper section, the lower section being formed of refractory blocks highly resistant to heat from an underlying molten glass containing portion of the forehearth and having a vertical outlet opening formed in its longitudinal median portion, the upper section being formed of material having both good heat resisting and heat insulating properties and having a vertical outlet opening formed therein directly above and in line with the outlet opening of the lower section, said intermediate section being formed to provide a cooling chamber therein between the longitudinal median portions of the lower and upper sections and in open communication intermediate its length with the vertical outlet openings in the lower and upper sections respectively, said intermediate section also being formed to provide a pair of cooling air manifolds extending along opposite sides of said cooling chamber and each communicating with the adjacent side of the cooling chamber through numerous transverse ports provided at closely spaced intervals along substantially the entire length of the cooling chamber for discharge of cooling air under pressure from the manifolds into opposite sides of said cooling chamber, and means to supply cooling air under pressure to said manifolds.

4. In a forehearth, a roof structure as defined by claim 3 wherein said transverse ports between said manifolds and said cooling chamber are formed to extend vertically from the upper surface of the underlying portions of said lower section to the under surface of the overlying portions of said upper section of the roof structure.

5. In a forehearth, a roof structure formed to provide a vertical outlet passage for exhaust gases in its longitudinal median portion, a cooling chamber located in said roof structure and communicatingly intersecting the outlet passage above the lower surface of the roof structure and of greater area in horizontal cross section than the outlet passage, said cooling chamber extending in said roof structure both ways from said outlet passage in the direction of length of the roof structure, and means for supplying cooling air under pressure to the cooling chamber, said means comprising cooling air manifolds in the roof structure extending along opposite sides of the cooling chamber for the full length thereof and each communicating with the adjacent side of the cooling chamber through numerous closely spaced transverse ports between the cooling chamber and the adjacent manifold, and means to supply cooling air under pressure to said manifolds.

6. In a forehearth, a roof structure as defined by claim 5 wherein the means for supplying cooling air under pressure to said manifolds comprises air supply pipes having discharge ends operatively connected with the outer sides of said manifolds, and in combination therewith, baffles in said manifolds in front of the discharge ends of said pipes to diffuse the discharged streams of air throughout the manifolds.

THOMAS W. GRIFFIN.

REFERENCES CITED

The following references are of record in the file of this patent:

UNITED STATES PATENTS

| Number | Name | Date |
|---|---|---|
| 545,630 | Kenney | Sept. 3, 1895 |
| 1,894,249 | Williams | Jan. 10, 1933 |
| 1,917,682 | Adam et al. | July 11, 1933 |
| 2,144,973 | Honiss | Jan. 24, 1939 |